(No Model.)
W. B. PAGE.
FASTENER FOR GLOVES, &c.
No. 583,658. Patented June 1, 1897.
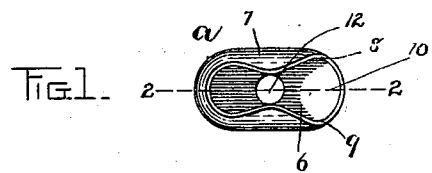
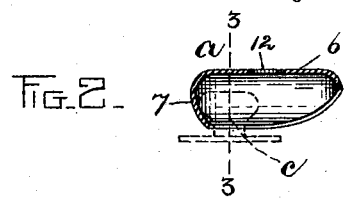
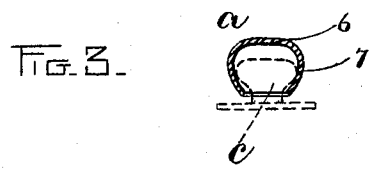
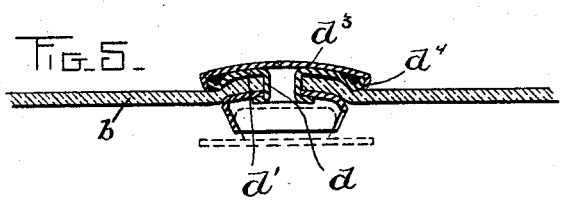
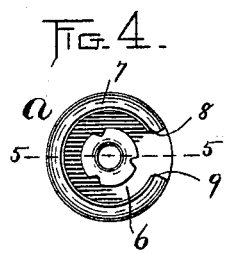
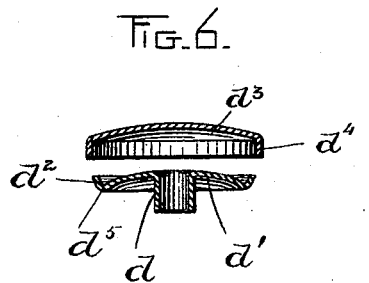
WITNESSES:
A. D. Harrison.
P. W. Pezzutti
INVENTOR:
Warren B. Page
J. Knight Brown & Quinby
Attys.
THE NORRIS PETERS CO., PHOTO-LITHO., WASHINGTON, D. C.

UNITED STATES PATENT OFFICE.

WARREN B. PAGE, OF NEWTON, MASSACHUSETTS, ASSIGNOR OF ONE-THIRD TO WILLIAM B. DRAPER, OF MALDEN, MASSACHUSETTS.

FASTENER FOR GLOVES, &c.

SPECIFICATION forming part of Letters Patent No. 583,658, dated June 1, 1897.

Application filed November 16, 1896. Serial No. 612,310. (No model.)

*To all whom it may concern:*

Be it known that I, WARREN B. PAGE, of Newton, in the county of Middlesex and State of Massachusetts, have invented certain new and useful Improvements in Fasteners for Gloves, &c., of which the following is a specification.

This invention relates to separable fasteners of the ball-and-socket type, each comprising a socket member having provisions for attachment to one part of the glove or other article to be fastened and a complemental ball or stud having provisions for attachment to another part of the glove.

The invention has particular reference to the socket member of a fastening of this character, and has for its object to provide a socket member adapted to be readily connected with and disengaged from the complemental ball member and to effectually resist the strain or pressure to which the members are subjected when in use by the tension of the connected pieces, thus preventing the separation of the members by such strain.

The invention consists in the improvements which I will now proceed to describe and claim.

Of the accompanying drawings, forming a part of this specification, Figure 1 represents a plan view of my improved fastening member. Fig. 2 represents a section on line 2 2 of Fig. 1. Fig. 3 represents a section on line 3 3 of Fig. 1. Fig. 4 represents a plan view showing a modified form of fastening member embodying my invention. Fig. 5 represents a section on line 5 5 of Fig. 4. Fig. 6 represents a sectional view of the parts of the socket-securing device separated from each other.

The same letters and numerals of reference indicate the same parts in all the figures.

In the drawings, *a* represents a fastening member embodying my invention, the same comprising the dome or body portion 6, which is made from sheet metal and has suitable provisions, as hereinafter described, for attachment to a part *b* of a glove or other article, and a flange 7, which is formed on the margin of said dome or body portion and is integral therewith, the dome or body portion and its flange being struck up from a single piece of suitably-tempered sheet metal. The dome may be of any suitable shape, and may be of the oblique form represented in Fig. 1 or of the circular form represented in Fig. 4. The flange conforms to the shape of the margin of the dome or body portion and is distinguished by being made of practically U shape—that is to say, the said flange extends continuously around the margin of the dome or body portion, excepting between the points 8 and 9, where it is cut away, forming an opening 10. The end portions of the U-shaped flange are shown in Fig. 1 as substantially parallel, while in Fig. 4 they are shown as curved and converging toward the opening 10.

It will be seen that by giving the flange a U-shaped form, as described and shown, I make the end portions of the flange resilient, so that they can spring freely out and in, while the curved central portion of the flange, which connects said end portions, forms a practically rigid abutment for the complemental fastening member *c*. (Represented in dotted lines in Figs. 1, 2, and 3.)

The member *a* is to be securely attached to the glove or other article in such position that the strain exerted on the two members by the tension on the pieces connected by said members will press the member *c* against the curved central portion or rigid abutment of the flange, so that the flange cannot yield and permit the accidental separation of the members in the direction of the strain which said members are intended to support. The flange is curved inwardly under the marginal portion of the dome, so that its outer edge engages the member *c*, as shown in Figs. 2 and 3, in such manner as to prevent free separation of one member from the other, such as would be produced by relative movements of the two members in other directions, both the side portions and the curved central portion of the flange hooking over the member *c*, the side portions also yieldingly engaging said member, while the central portion is practically rigid, as already stated.

In the form shown in Figs. 1, 2, and 3 the opening 10 between the end portions of the flange is preferably of sufficient width to receive the member *c*, so that the latter slips freely into the socket member between the end portions of the flange. The two members may be engaged, however, by pressing the member $a$ onto the member $c$ when the latter bears upon the edges of the flanges at points between the opening 10 and the curved central portion of the flange, the elasticity of the side portions of the flange enabling them to yield to receive the member $c$ and afterward to close upon said member, as indicated in Fig. 3.

In the construction shown in Fig. 4 the opening 10 is not of sufficient width to receive the member $c$, the engagement being therefore due to the resilience of the end portions of the flange.

The term "U-shaped," as here used, is intended to describe a flange having a curved central portion forming an unyielding abutment, and end portions separated from each other and therefore having resilient extremities, said end portions extending continuously from the curved central portion to the opening between the resilient extremities of said end portions. The U shape exists whether the said end portions be practically straight, as shown in Fig. 4, or curved, as shown in Fig. 1.

The member $a$ may be attached to the part $b$ by means of a tubular shank $d$, formed as an eyelet, which passes through the part $b$ and through an orifice 12 in the dome or body portion, said eyelet being spread or upset on the outer side of the dome or body portion and provided with a head $d'$, between which and the member $a$ the part $b$ is clamped. Any other suitable means may be employed, however, to secure the member $a$.

The head $d'$ is covered by a cap $d^3$, having a flange $d^4$, which is bent inwardly over the margin of the head. To prepare the head for engagement with the cap, I form on the head an annular depression $d^5$, the outer side of which constitutes an outwardly-inclined flange or seat $d^2$, against which the flange $d^4$ is pressed, the latter being thus inwardly inclined and interlocked with the flange $d^2$. The flange $d^4$ and the annular depression $d^5$ together form a marginal bead surrounding a cavity or recess which conforms approximately to the dome portion of the socket member. It will be seen that the annular depression $d^5$, which can be formed at one operation, reduces the expense of making the said marginal bead, it being necessary for the completion of said bead only to bend the flange $d^4$ slightly inward against the flange $d^2$, this requiring but one operation. Heretofore the marginal bead has been formed wholly by the flange or margin of the cap $d^3$, said margin being rolled inwardly by several successive operations over the margin of the head $d'$.

I claim—

A socket fastening member comprising a dome or body portion formed to bear upon the flap or piece to which the member is secured, a U-shaped flange integral with said dome and having resilient end portions and a practically rigid central portion continuous therewith, and a fastening device formed to engage said dome and attach the same positively to the said piece to prevent it from rotating, said resilient and rigid portions forming a ball-receiving chamber which unyieldingly supports the ball member in the direction required to resist the strain exerted on the two members by the tension of the connected pieces and yieldingly grasps said member to prevent accidental displacement of the ball member in other directions.

In testimony whereof I have signed my name to this specification, in the presence of two subscribing witnesses, this 7th day of November, A. D. 1896.

WARREN B. PAGE.

Witnesses:
A. D. HARRISON,
P. W. PEZZETTI.